(12) United States Patent
Iwasaki

(10) Patent No.: US 7,900,136 B2
(45) Date of Patent: Mar. 1, 2011

(54) STRUCTURED DOCUMENT PROCESSING APPARATUS AND STRUCTURED DOCUMENT PROCESSING METHOD, AND PROGRAM

(75) Inventor: Shingo Iwasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1002 days.

(21) Appl. No.: 11/285,533

(22) Filed: Nov. 21, 2005

(65) Prior Publication Data
US 2006/0112327 A1 May 25, 2006

(30) Foreign Application Priority Data
Nov. 25, 2004 (JP) ............................. 2004-340802

(51) Int. Cl.
*G06F 17/00* (2006.01)
(52) U.S. Cl. ....................................... 715/237; 715/277
(58) Field of Classification Search .................. 715/239, 715/234, 243, 277
See application file for complete search history.

(56) References Cited

U.S. PATENT DOCUMENTS

| | | | | |
|---|---|---|---|---|
| 6,836,778 B2 * | 12/2004 | Manikutty et al. | ........... | 707/102 |
| 6,910,182 B2 * | 6/2005 | Huang | ......................... | 715/239 |
| 6,986,104 B2 * | 1/2006 | Green et al. | ................ | 715/234 |
| 7,013,306 B1 * | 3/2006 | Turba et al. | .................. | 707/101 |
| 7,069,504 B2 * | 6/2006 | Mani et al. | ................... | 715/239 |
| 7,111,234 B2 * | 9/2006 | Peck et al. | ................... | 715/255 |
| 7,174,327 B2 * | 2/2007 | Chau et al. | ..................... | 707/3 |
| 7,222,333 B1 * | 5/2007 | Mor et al. | .................... | 717/115 |
| 7,225,411 B1 * | 5/2007 | Stoner et al. | ................ | 715/760 |
| 7,281,211 B2 * | 10/2007 | Jeannette et al. | ............ | 715/234 |
| 7,296,223 B2 * | 11/2007 | Chidlovskii et al. | ......... | 715/234 |
| 7,392,468 B2 * | 6/2008 | Igata et al. | ................... | 715/203 |
| 7,437,374 B2 * | 10/2008 | Chen et al. | ........................ | 1/1 |
| 2002/0038319 A1 * | 3/2002 | Yahagi | ....................... | 707/513 |
| 2002/0184213 A1 * | 12/2002 | Lau et al. | ....................... | 707/6 |
| 2003/0093760 A1 * | 5/2003 | Suzuki et al. | ............... | 715/523 |
| 2003/0167445 A1 * | 9/2003 | Su et al. | ...................... | 715/513 |
| 2004/0088397 A1 * | 5/2004 | Becker et al. | ............... | 709/223 |
| 2004/0111676 A1 * | 6/2004 | Jang et al. | ................... | 715/513 |

FOREIGN PATENT DOCUMENTS

| | | |
|---|---|---|
| JP | 2002-183116 A | 6/2002 |
| JP | 2004-30582 | 1/2004 |
| JP | 2004-38334 | 2/2004 |

OTHER PUBLICATIONS

Milo, Tova, et al, "Exchanging Intensional XML Data", SIGMOD '03: Proceedings of the 2003 ACM SIGMOD International Conference on Management of Data, Jun. 2003, pp. 289-300.*

* cited by examiner

*Primary Examiner* — Laurie Ries
(74) *Attorney, Agent, or Firm* — Cowan, Liebowitz & Latman, P.C.

(57) ABSTRACT

A structured document processing method selects elements of a first structured document in accordance with first designation information corresponding to the first structured document, and builds the elements of the first structured document selected in the selection step into a second structured document in accordance with second designation information corresponding to the second structured document.

18 Claims, 16 Drawing Sheets

```xml
<?xml version="1.0" encoding="Shift_jis"?>
<list>
 <class number="1">
  <teacher>
   <name>A</name>
    <security>
     <address>TOKYO</address>
     <tel>03-1111-1111</tel>
    </security>
  </teacher>
  <student>
   <name>B</name>
    <security>
     <address>KANAGAWA</address>
     <tel>045-2222-2222</tel>
    </security>
  </student>
  <student>
   <name>C</name>
    <security>
     <address>KANAGAWA</address>
     <tel>045-3333-3333</tel>
    </security>
  </student>
 </class>
</list>
```

FIG. 2C

| ELEMENT NUMBER | LAYER NUMBER | ELEMENT NAME | name space NAME | TEXT ELEMENT VALUE | PARENT ELEMENT NUMBER | PREVIOUS BROTHER NUMBER | ELEMENT APPEARANCE ORDER NUMBER | NUMBER OF ATTRIBUTES | ATTRIBUTE NAME | ATTRIBUTE VALUE |
|---|---|---|---|---|---|---|---|---|---|---|
| 0 | 0 | list | null |  | -1 | 0 | 1 | 0 |  |  |
| 1 | 1 | class | null |  | 0 | 0 | 1 | 1 | number | 1 |
| 2 | 2 | teacher | null |  | 1 | 0 | 1 | 0 |  |  |
| 3 | 3 | name | null | A | 2 | 0 | 1 | 0 |  |  |
| 4 | 3 | security | null |  | 2 | 3 | 1 | 0 |  |  |
| 5 | 4 | address | null | TOKYO | 4 | 0 | 1 | 0 |  |  |
| 6 | 4 | tel | null | 03-1111-1111 | 4 | 5 | 1 | 0 |  |  |
| 7 | 2 | student | null |  | 1 | 2 | 1 | 0 |  |  |
| 8 | 3 | name | null | B | 7 | 0 | 1 | 0 |  |  |
| 9 | 3 | security | null |  | 7 | 8 | 1 | 0 |  |  |
| 10 | 4 | address | null | KANAGAWA | 9 | 0 | 1 | 0 |  |  |
| 11 | 4 | tel | null | 045-2222-2222 | 9 | 10 | 1 | 0 |  |  |
| 12 | 2 | student | null |  | 1 | 7 | 2 | 0 |  |  |
| 13 | 3 | name | null | C | 12 | 0 | 1 | 0 |  |  |
| 14 | 3 | security | null |  | 12 | 13 | 1 | 0 |  |  |
| 15 | 4 | address | null | KANAGAWA | 14 | 0 | 1 | 0 |  |  |
| 16 | 4 | tel | null | 045-3333-3333 | 14 | 15 | 1 | 0 |  |  |

F I G. 3A

310

1 teacher/security/address
2 class/student[position()="2"]/security/tel
3 name

```
1 teacher, security, address
2 class, student#2, security, tel
3 name
```

FIG. 5B

CHARACTER STRING TO BE FINALLY OUTPUT

`<list><class number="1"><teacher><nameA></name>···` ~520

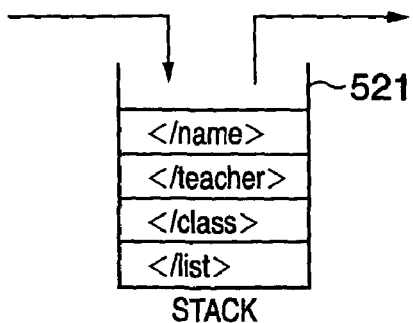

521

| `</name>` |
| `</teacher>` |
| `</class>` |
| `</list>` |

STACK

522

```
<?xml version="1.0" encoding="Shift_jis"?>
<list>
 <class number="1">
  <teacher>
   <name>A</name>
   <security>
    <address>TOKYO</address>
   </security>
  </teacher>
  <student>
   <name>B</name>
  </student>
  <student>
   <name>C</name>
   <security>
    <tel>045-3333-3333</tel>
  </student>
 </class>
</list>
```

FIG. 6A

```xml
<?xml version="1.0" encoding="Shift_jis"?>
<list>
 <class number="1">
  <teacher>
   <name>A</name>
    <security>
     <address>TOKYO</address>
     <tel>03-1111-1111</tel>
    </security>
  </teacher>
  <student>
   <name>B</name>
    <security>
     <address>KANAGAWA</address>
     <tel>045-2222-2222</tel>
    </security>
  </student>
  <student>
   <name>C</name>
    <security>
     <address>KANAGAWA</address>
     <tel>045-3333-3333</tel>
    </security>
  </student>
 </class>
</list>
```
~601

FIG. 6B

```
<?xml version="1.0" encoding="Shift_jis"?>
<NAME LIST>
 <NAME>
 <n>D</n>
 <n></n>
 </NAME>
 <ADDRESS>
  <security>
    <z>SAITAMA</z>
    <z></z>
  </security>
 </ADDRESS>
 <TELEPHONE>
  <security>
    <t>090-0000-0000</t>
    <t></t>
  </security>
 </TELEPHONE>
</NAME LIST>
```
~602

| ELEMENT NUMBER | LAYER NUMBER | ELEMENT NAME | name space NAME | TEXT ELEMENT VALUE | PARENT ELEMENT NUMBER | PREVIOUS BROTHER NUMBER | ELEMENT APPEARANCE ORDER NUMBER | NUMBER OF ATTRIBUTES | ATTRIBUTE NAME | ATTRIBUTE VALUE |
|---|---|---|---|---|---|---|---|---|---|---|
| 0 | 0 | list | null |  | -1 | 0 | 1 | 0 |  |  |
| 1 | 1 | class | null |  | 0 | 0 | 1 | 1 | number | 1 |
| 2 | 2 | teacher | null |  | 1 | 0 | 1 | 0 |  |  |
| 3 | 3 | name | null | A | 2 | 0 | 1 | 0 |  |  |
| 4 | 3 | security | null |  | 2 | 3 | 1 | 0 |  |  |
| 5 | 4 | address | null | TOKYO | 4 | 0 | 1 | 0 |  |  |
| 6 | 4 | tel | null | 03-1111-1111 | 4 | 5 | 1 | 0 |  |  |
| 7 | 2 | student | null |  | 1 | 2 | 1 | 0 |  |  |
| 8 | 3 | name | null | B | 7 | 0 | 1 | 0 |  |  |
| 9 | 3 | security | null |  | 7 | 8 | 1 | 0 |  |  |
| 10 | 4 | address | null | KANAGAWA | 9 | 0 | 1 | 0 |  |  |
| 11 | 4 | tel | null | 045-2222-2222 | 9 | 10 | 1 | 0 |  |  |
| 12 | 2 | student | null |  | 1 | 7 | 2 | 0 |  |  |
| 13 | 3 | name | null | C | 12 | 0 | 1 | 0 |  |  |
| 14 | 3 | security | null |  | 12 | 13 | 1 | 0 |  |  |
| 15 | 4 | address | null | KANAGAWA | 14 | 0 | 1 | 0 |  |  |
| 16 | 4 | tel | null | 045-3333-3333 | 14 | 15 | 1 | 0 |  |  |

607

| ELEMENT NUMBER | LAYER NUMBER | ELEMENT NAME | name space NAME | TEXT ELEMENT VALUE | PARENT ELEMENT NUMBER | PREVIOUS BROTHER NUMBER | ELEMENT APPEARANCE ORDER NUMBER | NUMBER OF ATTRIBUTES | ATTRIBUTE NAME | ATTRIBUTE VALUE |
|---|---|---|---|---|---|---|---|---|---|---|
| 0 | 0 | NAME_LIST | null |  | -1 | 0 | 1 | 0 |  |  |
| 1 | 1 | NAME | null |  | 0 | 0 | 1 | 0 |  |  |
| 2 | 2 | n | null | D | 1 | 0 | 1 | 0 |  |  |
| 3 | 2 | n | null |  | 1 | 2 | 2 | 0 |  |  |
| 4 | 1 | ADDRESS | null |  | 0 | 1 | 1 | 0 |  |  |
| 5 | 2 | security | null |  | 4 | 0 | 1 | 0 |  |  |
| 6 | 3 | z | null | SAITAMA | 5 | 0 | 1 | 0 |  |  |
| 7 | 3 | z | null |  | 0 | 0 | 2 | 0 |  |  |
| 8 | 1 | TELEPHONE | null |  | 0 | 4 | 1 | 0 |  |  |
| 9 | 2 | security | null |  | 6 | 0 | 1 | 0 |  |  |
| 10 | 3 | t | null | 090-0000-0000 | 9 | 0 | 1 | 0 |  |  |
| 11 | 3 | t | null |  | 9 | 10 | 2 | 0 |  |  |

609

| ELEMENT NUMBER | LAYER NUMBER | ELEMENT NAME | name space NAME | TEXT ELEMENT VALUE | PARENT ELEMENT NUMBER | PREVIOUS BROTHER NUMBER | ELEMENT APPEARANCE ORDER NUMBER | NUMBER OF ATTRIBUTES | ATTRIBUTE NAME | ATTRIBUTE VALUE |
|---|---|---|---|---|---|---|---|---|---|---|
| 0 | 0 | NAME_LIST | null |  | -1 | 0 | 1 | 0 |  |  |
| 1 | 1 | NAME | null |  | 0 | 0 | 1 | 0 |  |  |
| 2 | 2 | n | null | D | 1 | 0 | 1 | 0 |  |  |
| 3 | 2 | n | null | A | 1 | 2 | 2 | 0 |  |  |
| 4 | 1 | ADDRESS | null |  | 0 | 1 | 1 | 0 |  |  |
| 5 | 2 | security | null |  | 4 | 0 | 1 | 0 |  |  |
| 6 | 3 | z | null | SAITAMA | 5 | 0 | 1 | 0 |  |  |
| 7 | 3 | z | null | TOKYO | 0 | 0 | 2 | 0 |  |  |
| 8 | 1 | TELEPHONE | null |  | 0 | 4 | 1 | 0 |  |  |
| 9 | 2 | security | null |  | 6 | 0 | 1 | 0 |  |  |
| 10 | 3 | t | null | 090-0000-0000 | 9 | 0 | 1 | 0 |  |  |
| 11 | 3 | t | null | 045-3333-3333 | 9 | 10 | 2 | 0 |  |  |

```
<?xml version="1.0" encoding="Shift_jis"?>
<NAME LIST>
 <NAME>
  <n>D</n>
  <n>A</n>
 </NAME>
 <ADDRESS>
  <security>
   <z>SAITAMA</z>
   <z>TOKYO</z>
  </security>
 </ADDRESS>
 <TELEPHONE>
  <security>
   <t>090-0000-0000</t>
   <t>045-3333-3333</t>
  </security>
 </TELEPHONE>
</NAME LIST>
```

STRUCTURED DOCUMENT PROCESSING APPARATUS AND STRUCTURED DOCUMENT PROCESSING METHOD, AND PROGRAM

FIELD OF THE INVENTION

The present invention relates to a structured document processing technique.

BACKGROUND OF THE INVENTION

Effective information utilization techniques of digital structured document information occupy very important positions in a wide range of exchange/distribution of information including the Internet. For example, these techniques represented by XML (extensible Markup Language) have been developed toward information environments based on WEB, and are standardized as structured languages.

However, a systematic language processing technique associated with automatic analysis of structured document structures and transformation into other structured documents is not available. Conventionally, in order to extract required pieces of information from information of input structured documents and to combine and output them as a structured document having another structure, the structure of the input structured documents, and that of the structured document to be output must be recognized, and generation of XSLT (XML Transformations) and programming for extracting information from structured documents and outputting it as a structured document with a new structure are made.

As the aforementioned prior arts, for example, techniques described in two following patent references are known.
  Japanese Patent Laid-Open No. 2004-30582
  Japanese Patent Laid-Open No. 2004-38334

However, if the structures of the input structured document and that to be output are not known in advance, generation of XSLT and programming that considers the input structure and that to be output cannot be made, and it is difficult to extract required information from the input structured document and to output it as a structured document with a new structure.

SUMMARY OF THE INVENTION

The present invention has been made in consideration of the above problems, and has as its object to provide a structured document processing technique which allows transformation processing without any programming by recognizing the attributes of a structured document in advance upon executing transformation processing from a structured document into another structured document.

In order to achieve the above object, a structured document processing apparatus according to the present invention comprises:
  selection means for selecting elements of a first structured document in accordance with first designation information corresponding to the first structured document; and
  building means for building the elements of the first structured document selected by the selection means into a second structured document in accordance with second designation information corresponding to the second structured document.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A to 2C are views for explaining the processing of a structural analysis/decomposition unit 109;

FIGS. 3A to 3C are views for explaining the processing of a location path analysis unit 108;

FIG. 5B is a view for explaining the processing contents of the structure building unit 112; and FIGS. 6A to 6E are views for explaining the processing contents of a location path association/data transformation unit 113.

DETAILED DESCRIPTION OF THE PREFERRED EMBODIMENTS

Preferred embodiments of the present invention will now be described in detail in accordance with the accompanying drawings.

Figure 1A:
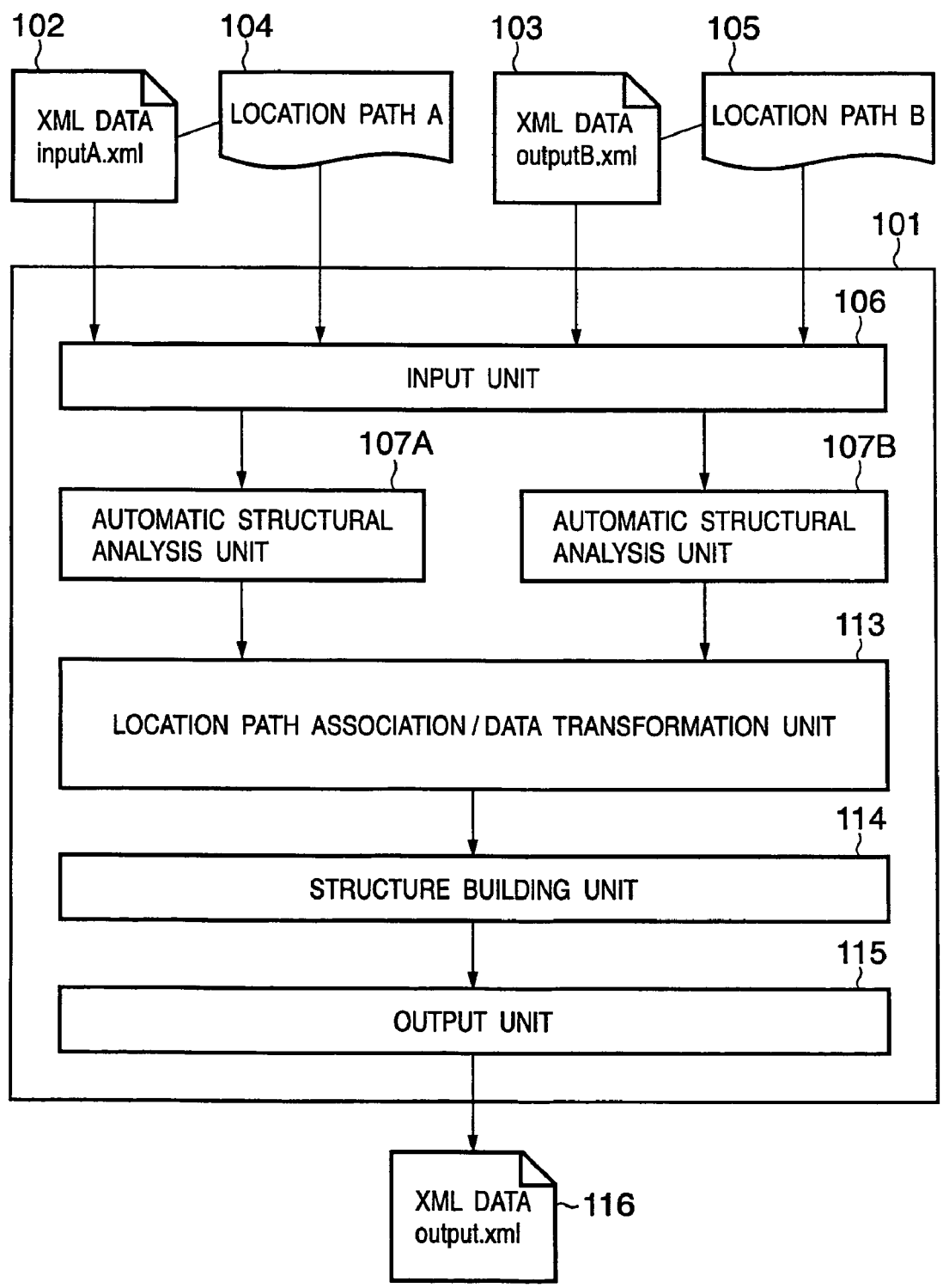
FIG. 1A is a block diagram showing the arrangement of a structured document processing apparatus according to an embodiment of the present invention.

FIG. 1A is a block diagram showing the arrangement of a structured document processing apparatus according to an embodiment of the present invention. Referring to FIG. 1A, reference numeral 101 denotes an analysis/transformation processing unit in the structured document processing apparatus. The analysis/transformation processing unit 101 can execute analysis/transformation processing, can store the processing result in a memory (not shown), and can execute processing by reading out data from the memory as needed under the systematic control of a control unit such as a CPU or the like (not shown). The analysis/transformation processing unit 101 includes an input unit 106 for executing input processing of a structured document (inputA.xml) 102, structured document (outputB.xml) 103, and location paths A and B (104, 105), automatic structural analysis units 107A and 107B, location path association/data transformation unit 113, structure building unit 114, and output unit 115.

Reference numeral 102 denotes a structured document (inputA.xml) input to the input unit 106; and 103, a structured document (outputB.xml) for output, which describes the structure of a document required to transform and output the structured document 102 (both the documents are XML data, and will be referred to as "XML data" hereinafter). Reference numerals 104 and 105 denote location paths indicating internal data of the structured documents 102 and 103, respectively.

The input unit 106 connects a network including the Internet, and can receive structured documents (e.g., XML, SGML, HTML, and the like) and location information (location paths) via the network. When the input unit 106 receives the structured documents (XML data) 102 and 103 and location paths A and B (104, 105), the automatic structural analysis units 107A and 107B start their processing.

Reference numeral 107A denotes an automatic structural analysis unit which performs structural analysis of the structured document (102) and location path A (104) received by the input unit 106, and performs selection of data and rebuilding of the structure on the basis of the structural analysis result. Reference numeral 107B denotes an automatic structural analysis unit similar to the unit 107A. The automatic structural analysis unit 107B performs structural analysis of the structured document (103) and location path B (105) received by the input unit 106, and performs selection of data and rebuilding of the structure on the basis of the structural analysis result.

Figure 1B:
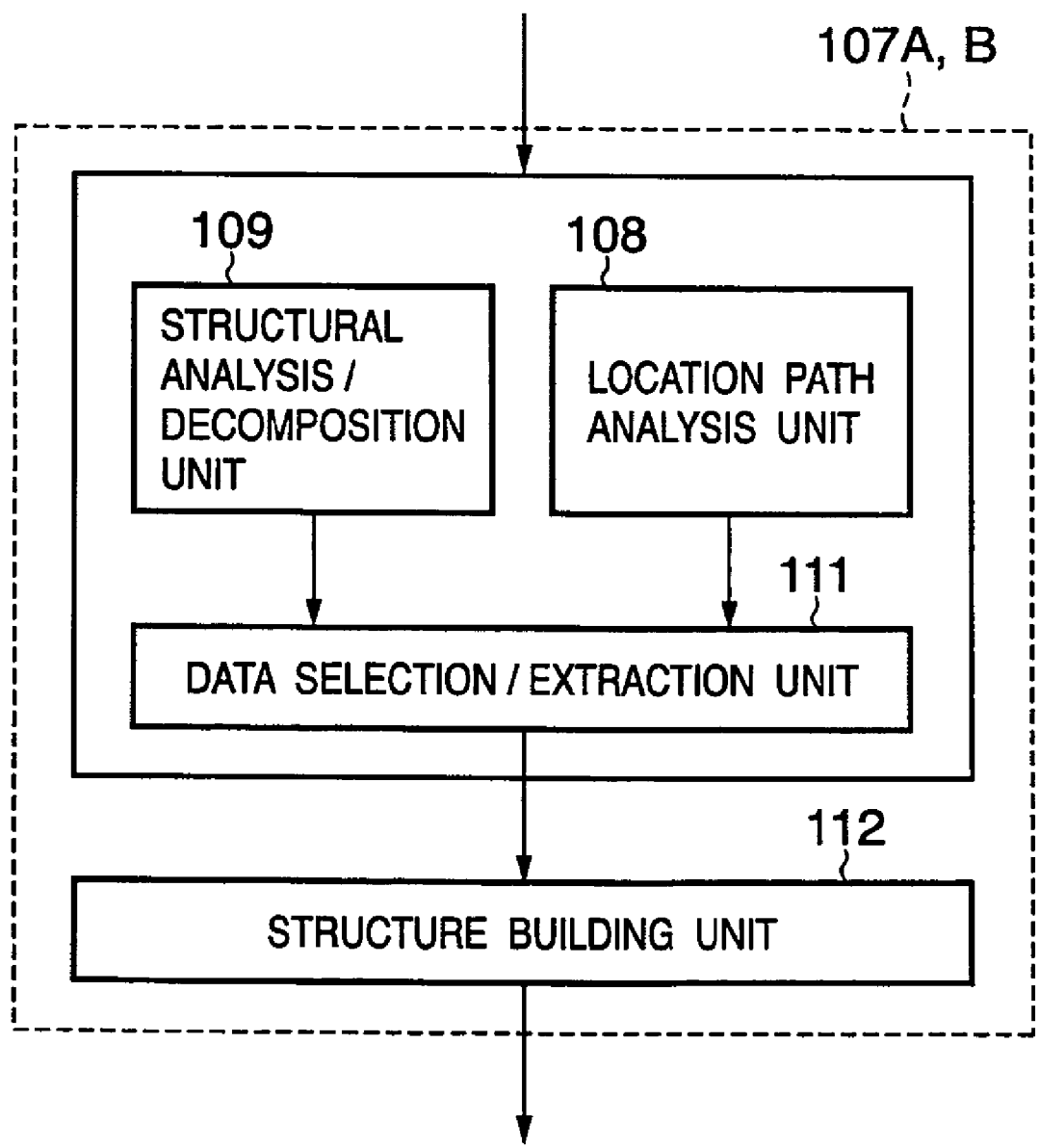
FIG. 1B is a block diagram showing details of the internal arrangement of automatic structural analysis units 107A and 107B.

FIG. 1B is a block diagram showing details of the internal arrangement of the automatic structural analysis units 107A and 107B. In FIG. 1B, reference numeral 109 denotes a structural analysis/decomposition unit. The structural analysis/decomposition unit 109 parses the input XML data 102 and 103 using, e.g., an SAX (The Simple API for XML) engine. The structural analysis/decomposition unit 109 generates a list of elements included in an XML data structure generated in turn by parsing on the memory (not shown). That is, the structural analysis/decomposition unit 109 associates, as additional information, a name of an element, a connection relationship (parent relationship, brother relationship) of element tags, a "value" bounded by element tags, an attribute name, and an attribute value to one element, and generates information obtained by decomposing the structures of the XML data 102 and 103 as XML data analysis lists.

Reference numeral 108 denotes a location path analysis unit which analyzes the input location paths A and B (104, 105), and stores the analysis results in the XML data analysis lists in a format which can indicate the contents of the XML data analysis lists generated on the memory (not shown).

Reference numeral 111 denotes a data selection/extraction unit, which executes processing for selecting and extracting, from the XML data analysis lists, all of list numbers of data indicated by the stored location paths from and list numbers associated with these list numbers (e.g., parent or brother relationships).

Reference numeral 112 denotes a structure building unit, which executes processing for extracting only temporarily decomposed XML data from the XML lists on the basis of the list numbers, rebuilding them, and outputting the rebuilt structure as, e.g., XML data.

Referring back to FIG. 1A, reference numeral 113 denotes a location path association/data transformation unit. The location path association/data transformation unit 113 associates the location path A 104 and the location path B 105, input to the input unit 106, on one-to-one level. The location path association/data transformation unit 113 transforms data stored in the XML data analysis lists of the input XML data (inputA.xml) 102 and output XML data (outputB.xml) 103 by associating the location paths, and outputs an XML data analysis list of the transformed output XML data.

Reference numeral 114 denotes a structure building unit which performs the same processing as the unit 112, i.e., processing for rebuilding data in the XML data analysis list as XML data, and outputs rebuilt XML data (output.xml) 116 from the output unit 115.

The output unit 115 may connect, e.g., a network including the Internet, and may deliver the rebuilt structured document (e.g., XML, SGML, HTML, or the like) to another apparatus via the network.

Figure 2B:
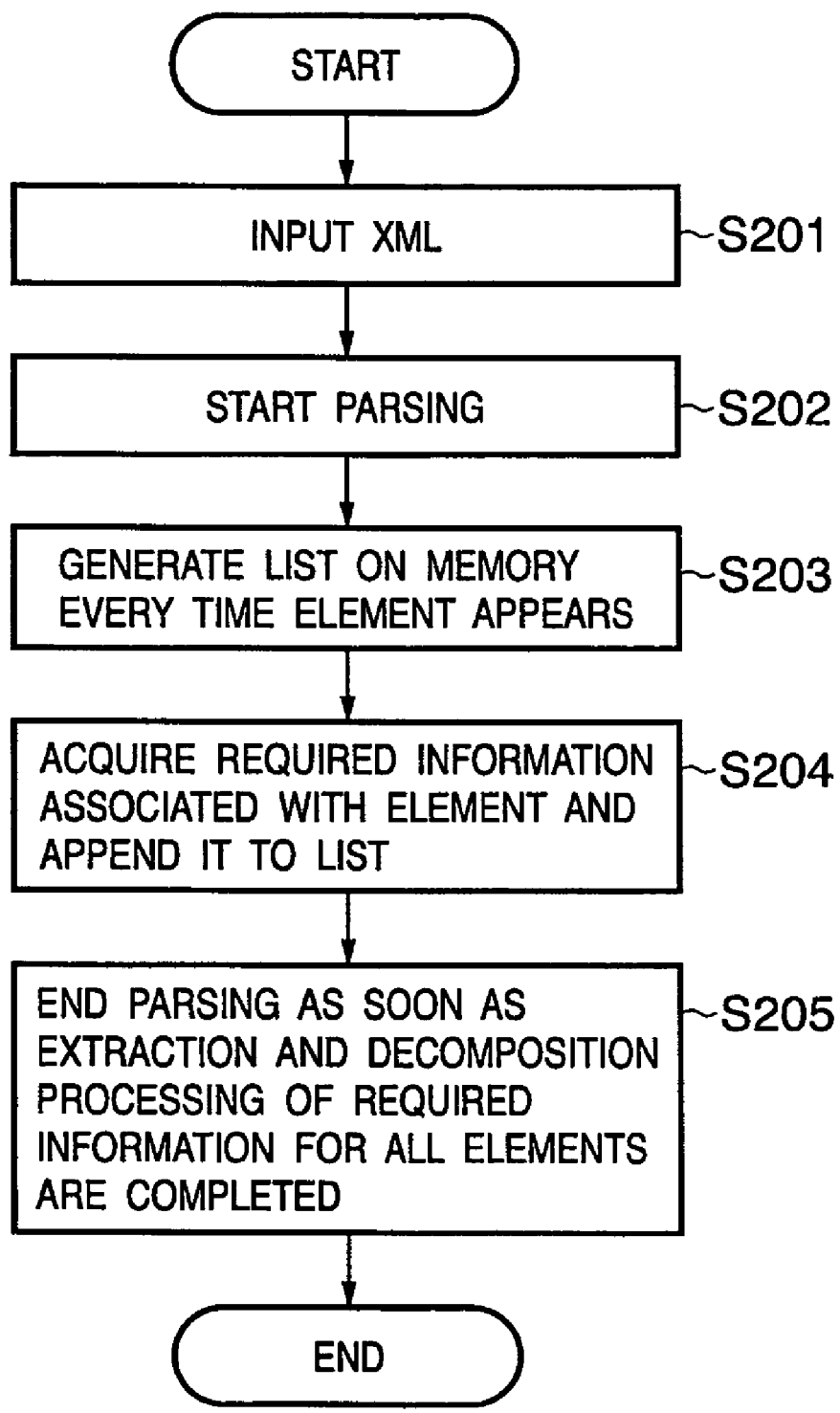

FIGS. 2A to 2C are views for explaining the processing of the structural analysis/decomposition unit 109. Referring to FIG. 2A, reference numeral 206 denotes a practical example of the input XML data (inputA.xml) 102. When this XML data 206 is input to the structural analysis/decomposition unit 109, the structural analysis/decomposition unit 109 executes the flowchart shown in FIG. 2B.

In FIG. 2B, the XML data 206 is input in step S201, and is parsed in turn from its first tag by the SAX engine in step S202. In step S203, numbers are assigned to elements in the structure of the XML data, which appear as a result of parsing on the memory, thus generating a list. In step S203, the numbers are assigned to elements in an order they appear on the memory by parsing.

In step S204, all of the layer number of an element, the name of the element, a text element value as a "value" bounded by element tags, a parent element number indicating a parent of the element tags, a previous brother number indicating a brother of the element tags, an element appearance order number indicating the order the element appears so as to discriminate that element when the same element name appears in the same layer, the number of attributes of the element, and the names and values of the attributes of the element are associated with one element as additional information. It is checked in step S205 if decomposition processing is complete for all elements. If the decomposition processing is not complete yet, the processing in step S204 is continued. As soon as the decomposition processing is complete, parsing ends (S205).

FIG. 2C shows an example of an XML data analysis list 209. The memory (not shown) stores information obtained by decomposing the structure of the XML data as such XML data analysis list.

Figure 3B:
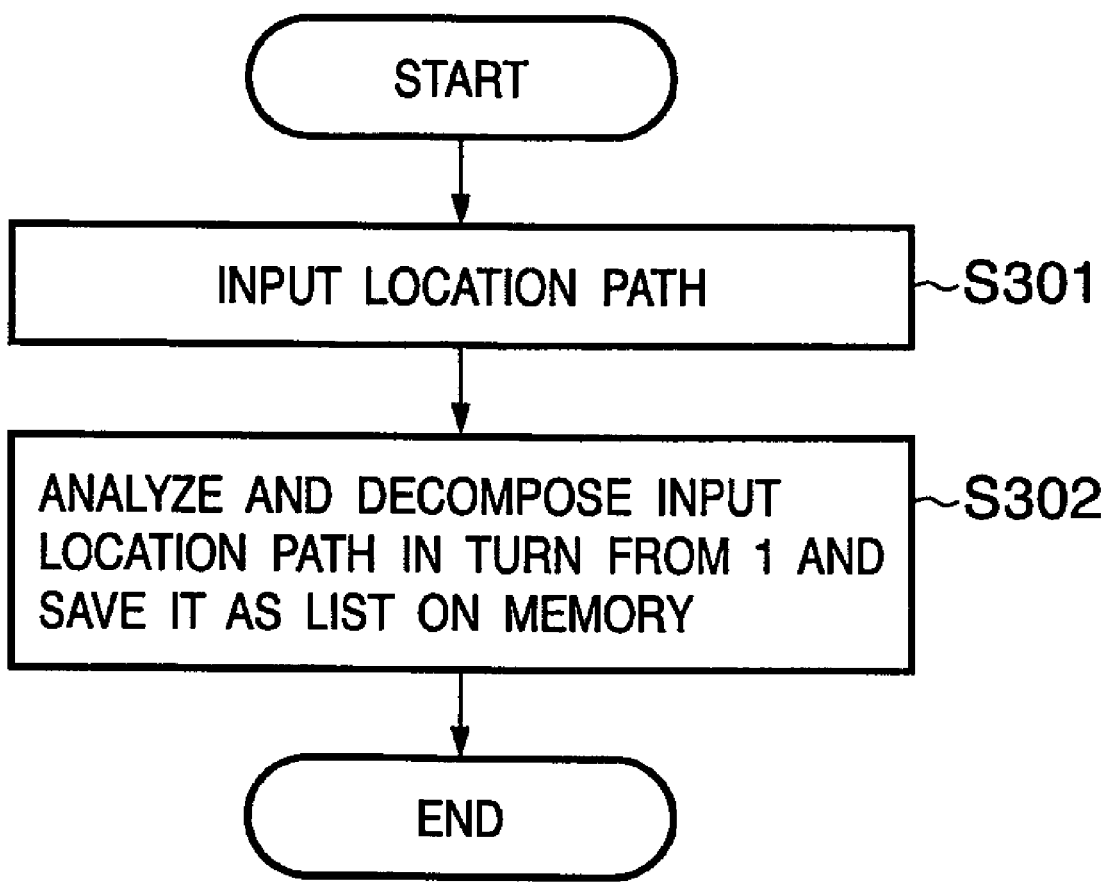

FIGS. 3A to 3C are views for explaining the location path analysis unit 108.

In FIG. 3A, reference numeral 310 denotes a practical example of the location path 104 indicating data in the input XML data 102. When this location path 310 is input to the location path analysis unit 108, the location path analysis unit 108 executes the flowchart shown in FIG. 3B.

In FIG. 3B, the location path 310 is input in step S301, and the location path analysis unit 108 analyses and decomposes the input location path in turn from 1, and saves it as a list on the memory (not shown), in step S302.

In FIG. 3C, reference numeral 304 denotes an example of a location path which is decomposed and saved as lists in step S302. If the location path 310 includes, e.g., an expression "student[position( )=1"2"]", this indicates that the same element name exists on the same layer number, and the second element of these element names is designated to distinguish them. In this case, a location path is stored in the form of "student#2" on the memory. For example, if the location path 310 includes an expression "class/@number", a location path is stored in the form of "class@number".

Figure 4:
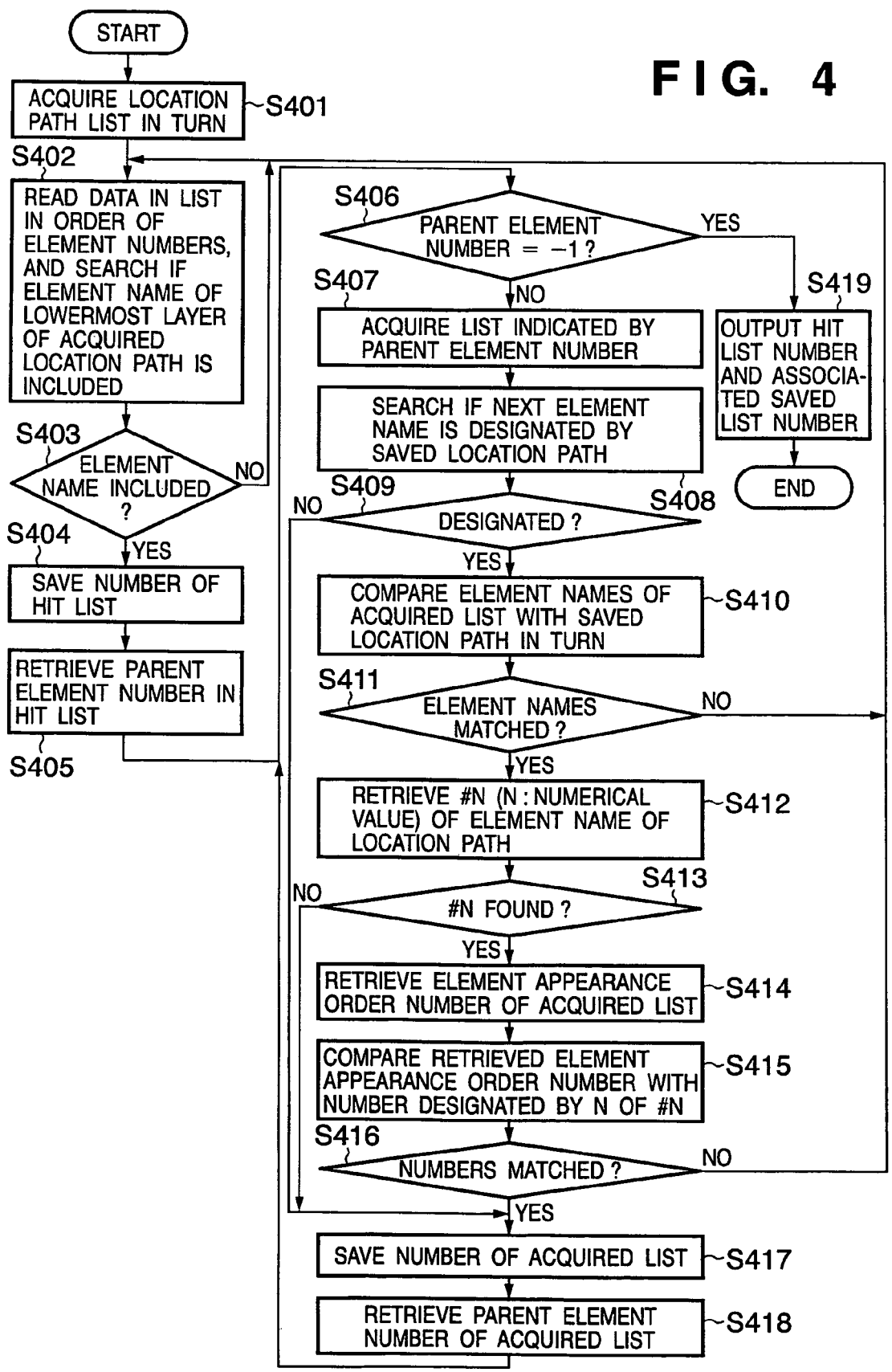
FIG. 4 is a flowchart for explaining the flow of processing of a data selection/extraction unit 111.

FIG. 4 is a flowchart for explaining the flow of processing of the data selection/extraction unit 111.

In step S401 in FIG. 4, the data selection/extraction unit 111 acquires the lists of the location path 304 in FIG. 3C described above in turn (the first list includes three element names "teacher", "security", and "address", the second list includes four element names "class", "student#2", "security", and "tel", and the third list includes one element name "name"). Initially, the following processing is executed using three element names "teacher", "security", and "address".

In step S402, elements are acquired from the XML data analysis list (FIG. 2C) in the order of element numbers (0, 1, . . . , 16). Initially, the following processing is done using an element with the element number=0. The element name of the acquired element is compared with that of the lowermost layer of the acquired location path list ("address" if processing is done using elements of the first list, "tel" if processing is done using elements of the second list, or "name" if processing is done using elements of the third list) to see if the element name acquired from the XML data analysis list is the same as that of the lowermost layer designated by the location path.

If it is determined in step S403 that the two element names are not the same (S403-NO), the flow returns to the process in step S402 that acquires the element of the next element number. If the two element names are the same (S403-YES), the flow advances to step S404 to save that element number, and the flow then advances to step S405. The element name of the element which is acquired first from the XML data analysis list (FIG. 2C) is "list", and it does not have the same element name. Hence, the flow returns to step S402 to acquire an element of the next element number (1). If an element of the element number=5 is acquired, since its element name "address" is the same as that of the element of the lowermost layer designated by the location path, the flow advances to step S404 to save its element number=5, and the flow advances to step S405.

In step S405, a parent element number of that element number is retrieved.

If it is determined in step S406, the parent element number is "−1" (S406-YES), the flow advances to step S419 to output the hit element number and the saved element number associated it that number. If the parent element number is "−1" from the very beginning, it indicates an element name of the root, and there is no saved list number associated with it.

On the other hand, if it is determined in step S406 that the parent element number is not "−1" (S406-NO), the flow advances to step S407 to acquire an element indicated by the parent element number.

It is searched in step S408 if the acquired location path designates the next element name, e.g., the parent element name of the element name of the lowermost layer ("security" before "address" in list 1) That is, if the element name "address" of the lowermost layer of the location path list 304 (FIG. 3C) matches the element name "address" of the element number=5, since the parent element number=4 of the element of the element number=5 is not "−1", the flow advances from step S406 to steps S407 and S408.

The presence/absence of designation is checked in step S409. If the absence of designation is detected (S409-NO), since the element indicated by that parent element number is required data, the flow jumps to step S417 to save the parent element number acquired in step S407.

If it is determined in step S409 that the presence of designation is detected (S409-YES), the flow advances to step S410, and the element names of the list indicated by the parent element number are compared in turn with those designated by that location path (e.g., security→teacher).

If it is determined in step S411 that at least one of the element names designated by the location path does not match an element name obtained by tracing the parent element numbers in the XML data analysis list (S411-NO), it is determined that list data designated by that parent element number is not necessary), and the flow returns to the process for acquiring the list of the next element number.

If the element names match (S411-YES), it is confirmed in step S412 if the element name designated by the location path is appended with "#N (N: numerical value)" as data (S412).

It is checked in step S413 if "#N" is appended. If "#N" is appended (S413-YES), the flow advances to step S414. In step S414, of the elements compared in step S410, an element appearance order number of an element corresponding to the element name appended with "#N" is acquired. For example, an element appearance order number=1 of an element with the element number=7 having an element name "student" is acquired. The number designated by N of "#N" is compared with the element appearance order number acquired in step S414 in step S415.

It is checked in step S416 if the two numbers match. If the two numbers do not match (S416-NO), it is determined that the list data designated by that parent element number is not necessary, and the flow returns to the process for acquiring the list of the next element number.

If the two numbers match (S416-YES), that parent element number is held (S417), and a parent element number of that list data is acquired (S418).

The flow returns to step S406 again to repeat from the process for checking if the parent element number is "−1".

Finally, the element numbers which are hit in the XML data analysis list by retrieval based on the path designated by the location path, and their associated element numbers are held.

More specifically, a total of five numbers hit the location paths (teacher/security/address) of the first list of the location path (304 in FIG. 3C) in the order of 5→4→2→1→0, and these numbers are extracted. Upon completion of the processing for one location path list, the location paths (class/student [position="2"]/security/tel) of the second list are acquired, and the same processing is repeated. Numbers hit the location paths of the second list in the order of 16→14→12→1→0. Since the location path (name) of the third list designates only "name", numbers hit the location path of that list in the order of 3→2→1→0, 8→7→1→0, and 13→12→1→0.

Upon completion of all the processes, if repetitive numbers are extracted, one of such repetitive numbers is left, all other numbers are deleted, and numbers which remain after deletion are output. As a result, a list of element numbers selected by the data selection/extraction unit 111 is given by:

List of element numbers:

$$0, 1, 2, 3, 4, 5, 6, 7, 8, 12, 13, 14, 15 \tag{1}$$

These are element numbers associated with data designated by all the location paths.

The processing of the structure building unit 112 will be described below with reference to FIGS. 5A and 5B.

Figure 5A:
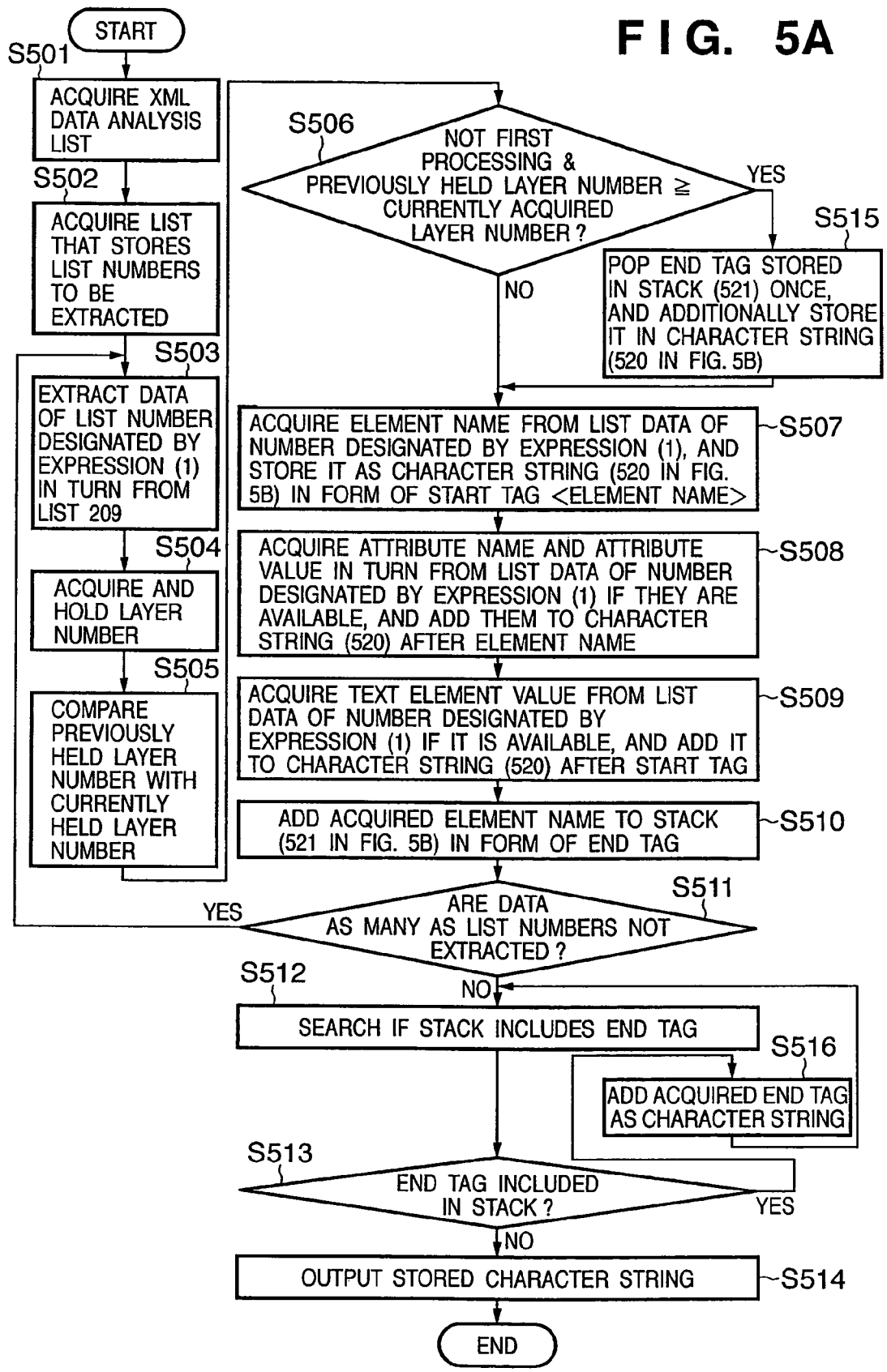
FIG. 5A is a flowchart for explaining the processing contents of a structure building unit 112.
Figure 6C:
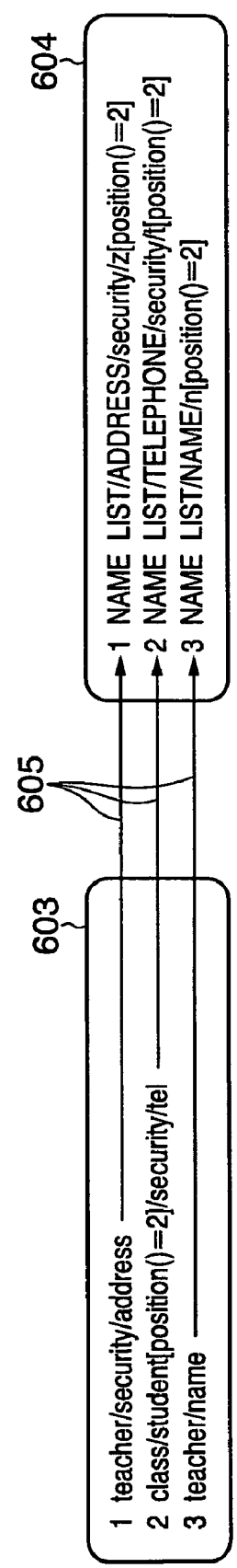

FIG. 5A is a flowchart for explaining the processing contents of the structure building unit 112. In step S501, the XML data analysis list (see FIG. 2C) is acquired from the structural analysis/decomposition unit 109.

In step S502, the list (see expression (1)) which holds the element numbers to be extracted from the XML data analysis list is acquired from the data selection/extraction unit 111.

In step S503, list data of the element number to be extracted is acquired from the XML data analysis list 209 (FIG. 2C) in turn. In case of expression (1), element data with the element number=0 is acquired first.

In step S504, the layer number of the extracted list data is acquired and held.

In step S505, the previously held layer number is compared with the currently held layer number. If it is determined in step S506 that the current processing is the first one or the previously held layer number<the currently acquired layer number (S506-NO), the flow advances to step S507 to acquire an element name from the list data, and store it in the form of a start tag "<element name>" (by appending '<' and '>' symbols) as a character string (520 in FIG. 5B).

In step S508, a corresponding attribute name and attribute value are acquired in turn from the XML data analysis list on the basis of the list data (expression (1)) if they are available, and are added to the character string (520 in FIG. 5B) while being additionally included in the start tag. For example, in case of an element with the element number=1, "number" and "1" are added to <class>, and <class number="1"> is stored consequently.

In step S509, a corresponding text element value is acquired from the XML data analysis list on the basis of the list data (expression (1)) if it is available, and is added as a character string (520 in FIG. 5B) after the start tag.

In step S510, the acquired element name is stored (pushed) in a stack (521 in FIG. 5B) in the form of an end tag "</element name>".

If the decision result in step S506 is true, i.e., if the current processing is not the first one, and the previously held layer number>=the currently acquired layer number (S506-YES), the flow advances to step S515 to extract (pop) the end tag stored in the stack (521 in FIG. 5B) once and to store it in the character string (520 in FIG. 5B).

If it is determined in step S511 that data are not extracted from the XML data analysis list (FIG. 2C) as many as the number of data of element numbers described in the element number list (expression (1)) (S511-YES), the flow returns to step S503 to repeat the same processing to non-extracted data.

On the other hand, if all data of the element numbers described in the list data (expression (1)) have been extracted (S511-NO), the flow advances to step S512 to confirm if the end tags still remain in the stack 521 in FIG. 5B.

If it is determined in step S513 that the end tags still remain in the stack (S513-YES), the end tag is acquired (popped) from the stack, and is added to the character string (520 in FIG. 5B) in step S516.

If no end tag remains (S513-NO), the flow advances to step S514, and the stored character string (520 in FIG. 5B) is output.

In this way, the structure building unit 112 extracts only data of the element numbers described in the element number list (expression (1)) (character string 520 in FIG. 5B) from the XML data analysis list 209 in FIG. 2C). Furthermore, the structure building unit 112 further builds up this character string, and finally outputs XML data 522 shown in FIG. 5B. As a result, the structure building unit 112 can extract only data selected based on the location paths without destroying the structure of the input XML data, and can output the XML data 522 in FIG. 5B.

FIGS. 6A to 6E are views for explaining the processing contents of the location path association/data transformation unit 113. The processing for extracting only data selected based on the location paths from one input XML data, and rebuilding and outputting them as XML data without destroying the structure has been described so far.

In this embodiment, the location path association/data transformation unit 113 is further added before the processing of the structure building unit 114. Therefore, XML data 102 for input of input data (to be referred to as input XML data 601 hereinafter) and XML data 103 for output of input data (to be referred to as output XML data 602 hereinafter) are loaded, and data selected based on the location path 104 (603) from the input XML data 102 (601) are inserted into elements selected based on the location path 105 (604) of the output XML data 103 (602), thus allowing data transformation using XML data with different structures. The flow of this processing will be described below.

Reference numeral 601 (FIG. 6A) denotes input XML data which has the same structure and data contents as those of the input XML data (inputA.xml) used in the above description. Reference numeral 602 (FIG. 6B) denotes output XML data which already stores some text element values, and has a structure different from that of the input XML data.

Reference numeral 603 (FIG. 6C) denotes a location path for the input XML data; and 604, a location path for the output XML data.

The location path association/data transformation unit 113 associates the first location paths, second location paths, and so forth of these two lists on one-to-one level like 605. The location path association/data transformation unit 113 executes the following processing using the location path association information. That is, the location path association/data transformation unit 113 loads the input XML data 601 held on the memory (not shown), and retrieves element numbers indicating data selected based on the location path 603 from an XML data analysis list 606 (the same as 209 in FIG. 2C) shown in FIG. 6D obtained from the input XML data 601 as a result of structural analysis. Then, the location path association/data transformation unit 113 copies data (608) selected from the XML data analysis list 606 to an XML data analysis list 607 obtained by analyzing the output XML data 602 using the location path association information, thus obtaining and outputting a data analysis list 609.

The location path association/data transformation unit 113 inputs all the element numbers of the data to the structure building unit 114 as list data 610. The structure building unit 114 receives the XML data analysis list 609 and the list data 610 of the element numbers, and executes extraction processing corresponding to the list data explained using FIG. 5A, thus outputting XML data 612 (FIG. 6E). More specifically, text element values "A", "Tokyo", and "045-3333-3333" as data in the input XML data 601 are stored in those selected by the location paths in the output XML data 602, respectively.

As a result, data selected using the location paths from the XML data 601 with a given structure can be inserted into fields designated by the location paths in the XML data 602 with another structure, and the XML structure can be transformed and output. Therefore, even when the structures of the input and output XML data are not recognized in advance, automatic transformation processing can be done by analyzing the XML data, thus allowing dynamic data exchange and dynamic XML structure transformation.

In this embodiment, only text element values are transformed. As for attribute values, similar transformation processing can be done between data with different structures by designating location paths.

Also, data indicating association of the location paths can be exchanged with another apparatus via the network. Hence, structured documents with different structures can be exchanged on the network.

As described above, according to this embodiment, upon executing transformation processing of a given structured document to another structured document, the transformation processing can be done based on association information of location paths without any programming while recognizing the attributes of the structured documents.

The present invention has been explained by way of its preferred embodiment. However, the present invention is not limited to the above embodiment, and various modifications can be made within the scope of the claims.

The objects of the present invention are also achieved by supplying a storage medium, which records a program code of a software program that can implement the functions of the above-mentioned embodiments to a system or apparatus, and reading out and executing the program code stored in the storage medium by a computer (or a CPU or MPU) of the system or apparatus. The storage location of the program code is not limited to a client computer. For example, the program code may be stored in a computer which functions as a server.

In this case, the program code itself read out from the storage medium implements the functions of the above-mentioned embodiments, and the storage medium which stores the program code constitutes the present invention.

As the storage medium for supplying the program code, for example, a flexible disk, hard disk, optical disk, magneto-optical disk, CD-ROM, CD-R, DVD, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-340802 filed on Nov. 25, 2004, which is hereby incorporated by reference herein.

What is claimed is:

1. A structured document processing apparatus comprising: the following each means is executed by a computer,
   input means for inputting a first structured document including a first element, and first designation information for designating a location in the first structured document at which the first element is included, a second structured document including a second element, and second designation information for designating a location in the second structured document at which no element is included and into which the first element is to be inserted;
   selection means for selecting the first element in the first structured document in accordance with the first designation information designating the location in the first structured document at which the first element is included; and
   inserting means for inserting the first element selected by said selection means into the second structured document at the location designated by the second designation information for designating the location into which the first element is to be inserted.

2. The apparatus according to claim 1, wherein said inserting means comprises association means for associating the first designation information and the second designation information, and said inserting means inserts the first element selected in accordance with the first designation information into the second structured document at the location designated by the second designation information associated to the first designation information.

3. The apparatus according to claim 2, wherein said association means associates a plurality of element names included in the first designation information and the second designation information in accordance with an order of element names.

4. The apparatus according to claim 1, wherein said selection means comprises analysis means for analyzing the first structured document and outputting an analysis list, and selects the element in the analysis list in accordance with the first designation information.

5. The apparatus according to claim 1, wherein said selection means selects the first element in the first structured document in accordance with an element name included in the first designation information.

6. The apparatus according to claim 1, wherein said selection means selects the first element in the first structured document in accordance with a plurality of element names included in the first designation information and an order of element names.

7. A structured document processing method comprising the steps of: following each step is executed by a computer,
   inputting a first structured document including a first element, and first designation information for designating a location in the first structured document at which the first element is included, a second structured document including a second element, and second designation information for designating a location in the second structured document at which no element is included and into which the first element is to be inserted;
   selecting the first element in the first structured document in accordance with the first designation information designating the location in the first structured document at which the first element is included; and
   inserting the first element selected in the selecting step into the second structured document at the location designated by the second designation information for designating the location into which the first element is to be inserted.

8. The method according to claim 7, wherein the inserting step comprises an association step of associating the first designation information and the second designation information, and the inserting step includes a step of inserting the first element selected in accordance with the first designation information into the second structured document at the location designated by the second designation information associated to the first designation information.

9. The method according to claim 8, wherein the association step includes a step of associating a plurality of element names included in the first designation information and the second designation information in accordance with an order of element names.

10. The method according to claim 7, wherein the selecting step comprises an analysis step of analyzing the first structured document and outputting an analysis list, and includes a step of selecting the element in the analysis list in accordance with the first designation information.

11. The method according to claim 7, wherein the selecting step includes a step of selecting the first element in the first structured document in accordance with element names included in the first designation information.

12. The method according to claim 7, wherein the selecting step includes a step of selecting the first element in the first structured document in accordance with a plurality of element names included in the first designation information and an order of element names.

13. A storage medium for storing a structured document processing program which causes a computer to execute a structured document processing method, said method comprising the steps of:
   inputting a first structured document including a first element, and first designation information for designating a location in the first structured document at which the first element is included, a second structured document including a second element, and second designation information for designating a location in the second structured document at which no element is included into which the first element is to be inserted;

selecting the first element in the first structured document in accordance with the first designation information designating the location in the first structured document at which the first element is included; and inserting the first element selected in the selecting step into the second structured document at the location designated by the second designation information for designating the location into which the first element is to be inserted.

14. The medium according to claim 13, wherein the inserting step comprises an association step of associating the first designation information and the second designation information, and the inserting step includes a step of inserting the first element selected in accordance with the first designation information into the second structured document at the location designated by the second designation information associated to the first designation information.

15. The medium according to claim 14, wherein the association step includes a step of associating a plurality of element names included in the first designation information and the second designation information in accordance with an order of element names.

16. The medium according to claim 13, wherein the selecting step comprises an analysis step of analyzing the first structured document and outputting an analysis list, and includes a step of selecting the element in the analysis list in accordance with the first designation information.

17. The medium according to claim 13, wherein the selecting step includes a step of selecting the first element in the first structured document in accordance with element names included in the first designation information.

18. The medium according to claim 13, wherein the selecting step includes a step of selecting the first element in the first structured document in accordance with a plurality of element names included in the first designation information and an order of element names.

* * * * *